(12) United States Patent
Chen et al.

(10) Patent No.: US 9,127,490 B2
(45) Date of Patent: Sep. 8, 2015

(54) TRANSMISSION MECHANISM FOR DUAL-SHAFT HINGE

(71) Applicant: LIANHONG ART CO., LTD., Taoyuan (TW)

(72) Inventors: Chia-Hui Chen, Taoyuan (TW); Tzu-Yu Lin, Taoyuan (TW); Yen-Ting Chen, Taoyuan (TW); Min-Hsiang Kao, New Taipei (TW)

(73) Assignee: LIANHONG ART CO., LTD., Taoyuan (TW)

( * ) Notice: Subject to any disclaimer, the term of this patent is extended or adjusted under 35 U.S.C. 154(b) by 0 days.

(21) Appl. No.: 14/549,499

(22) Filed: Nov. 20, 2014

(65) Prior Publication Data

US 2015/0159413 A1 Jun. 11, 2015

(30) Foreign Application Priority Data

Dec. 5, 2013 (TW) .............................. 102222831 U
Jan. 14, 2014 (TW) .............................. 103200732 U (51) Int. Cl.
*E05D 3/12* (2006.01)
*G06F 1/16* (2006.01)

(52) U.S. Cl.
CPC .............. *E05D 3/122* (2013.01); *G06F 1/1618* (2013.01)

(58) Field of Classification Search
CPC ......... Y10T 16/541; E05D 3/122; E05D 3/12; E05D 3/10; G06F 1/1618; G06F 1/1681

USPC .................... 16/354, 342, 366, 368
See application file for complete search history.

(56) References Cited

U.S. PATENT DOCUMENTS

| 7,414,834 | B2* | 8/2008 | Ukonaho et al. ......... 361/679.55 |
| 8,776,319 | B1* | 7/2014 | Chang et al. .................... 16/366 |
| 2007/0094846 | A1* | 5/2007 | Ishida .............................. 16/354 |
| 2007/0157752 | A1* | 7/2007 | Knopfle et al. ................... 74/27 |
| 2008/0172834 | A1* | 7/2008 | Sutterlutti ....................... 16/286 |
| 2009/0070961 | A1* | 3/2009 | Chung et al. .................... 16/354 |
| 2011/0157780 | A1* | 6/2011 | Wang et al. ............. 361/679.01 |
| 2013/0322004 | A1* | 12/2013 | Park ........................ 361/679.27 |
| 2014/0009874 | A1* | 1/2014 | Huang .................... 361/679.01 |

* cited by examiner

*Primary Examiner* — Emily Morgan
(74) *Attorney, Agent, or Firm* — Guice Patents PLLC (57) ABSTRACT

A transmission mechanism including a first shaft and a second shaft extending rotatably through a first positioning plate and a second positioning plate. The second positioning plate is spaced apart from the first positioning plate. A first gear is mounted on the first shaft between the first positioning plate and the second positioning plate, and has a first helical tooth portion. A second gear is mounted on the second shaft between the first positioning plate and the second positioning plate, and has a second helical tooth portion having a same tooth profile and helix angle as the first helical tooth portion. A middle gear is located between the first gear and the second gear and has a transmitting helical tooth portion engaging the first helical tooth portion and the second helical tooth portion. The middle gear rotates about an axis perpendicular with the first shaft and the second shaft.

3 Claims, 7 Drawing Sheets

TRANSMISSION MECHANISM FOR DUAL-SHAFT HINGE

BACKGROUND OF THE INVENTION

1. Field of the Invention

The invention relates to a transmission mechanism for a dual-shaft hinge, and more particularly to a transmission mechanism using helical gear set to synchronize rotation of two shafts of the hinge.

2. Description of the Related Art

It is a popular design for a display of a laptop detachable from its base. The detached display can be used as a tablet. When the display is joined to the base, is can be rotated to an arbitrary angle with respect to the base by a dual-shaft hinge. By the dual-shaft hinge, the display can even be flipped (rotated 360°) to overlap the base to serve as a tablet.

A conventional dual-shaft hinge includes a first shaft rotated along with the display and a second shaft rotated along with the mainframe. However, when the dual-display is rotated to a large angle or flip to overlap the mainframe by the dual shaft hinge, the display is rotated by one shaft to a specific angle first, and rotated to the intended angle by the other shaft. The entire rotation mechanism is so complicated that it causes high cost in manufacture and assembly, and also causes slow and not smooth in flip operation. It is inconvenient for the display flipped 360° by rotated to a predetermined angle by one shaft and then rotated by the other shaft.

The rotation of the display for a large angle is accomplished by the dual-shaft hinge. The conventional dual-shaft hinge is often equipped with complicated transmission mechanism which occupies large space and is not conducive to miniaturization of the laptop.

BRIEF SUMMARY OF THE INVENTION

The invention provides a transmission mechanism for a dual shaft hinge. The transmission mechanism in accordance with an exemplary embodiment of the invention includes a first shaft connected to a first mounting plate; a second shaft connected to a second mounting plate; a first positioning plate through which the first shaft and the second shaft extend rotatably; a second positioning plate, through which the first shaft and the second shaft extend rotatably, spaced from the first positioning plate by a distance; a first gear mounted on the first shaft, disposed between the first positioning plate and the second positioning plate and having a first helical tooth portion; a second gear mounted on the second shaft, disposed between the first positioning plate and the second positioning plate and having a second helical tooth portion having the same tooth profile and helix angle as the first helical tooth portion; and a middle gear disposed between the first gear and the second gear and having a transmitting helical tooth portion skewly engaging the first helical tooth portion and the second helical tooth portion.

In another exemplary embodiment, transmission mechanism further includes a frame disposed between the first positioning plate and the second positioning plate, wherein the middle gear is mounted on the frame.

In yet another exemplary embodiment, the frame has a space receiving the middle gear, and a pin extends through the frame to position the middle gear on the frame.

In another exemplary embodiment, the frame further has two lateral extending portion inserted into holes formed on the first positioning plate and the second positioning plate.

In yet another exemplary embodiment, the frame further has two lateral extending portion inserted into holes formed on the first positioning plate and the second positioning plate.

The transmission mechanism in accordance with another exemplary embodiment of the invention includes a first shaft connected to a first mounting plate at one end and fitted to at least one positioning plate, a concave washer and a first convex washer at the other end; a second shaft connected to a second mounting plate at one end and fitted to the positioning plate, the concave washer and a second convex washer at the other end; a first gear mounted on the first shaft, disposed between the positioning plate and the concave washer and having a first helical tooth portion; a second gear mounted on the second shaft, disposed between the positioning plate and the concave washer and having a second helical tooth portion having the same tooth profile and helix angle as the first helical tooth portion; and a middle gear disposed between the first gear and the second gear and having a transmitting helical tooth portion skewly engaging the first helical tooth portion and the second helical tooth portion, wherein the positioning plate has a first hole for the first shaft extending therethrough, a second hole for the second shaft extending therethrough and a clip slot to hold the middle gear.

In another exemplary embodiment, two tabs protruding from the positioning plate to form the clip slot, and each of the tabs has a through hole.

The transmission mechanism in accordance with another exemplary embodiment of the invention includes a first shaft connected to a first mounting plate at one end and fitted to at least one positioning plate, a concave washer and a first convex washer at the other end; a second shaft connected to a second mounting plate at one end and fitted to the positioning plate, the concave washer and a second convex washer at the other end; a first gear mounted on the first shaft, disposed between the positioning plate and the concave washer and having a first helical tooth portion; a second gear mounted on the second shaft, disposed between the positioning plate and the concave washer and having a second helical tooth portion having the same tooth profile and helix angle with the first helical tooth portion; and a middle gear disposed between the first gear and the second gear and having a transmitting helical tooth portion skewly engaging the first helical tooth portion and the second helical tooth portion, wherein the concave washer has a first hole for the first shaft extending therethrough, a second hole for the second shaft extending therethrough and a clip slot to hold the middle gear.

In another exemplary embodiment, two tabs protruding from the concave washer to form the clip slot, and each of the tabs has a through hole.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
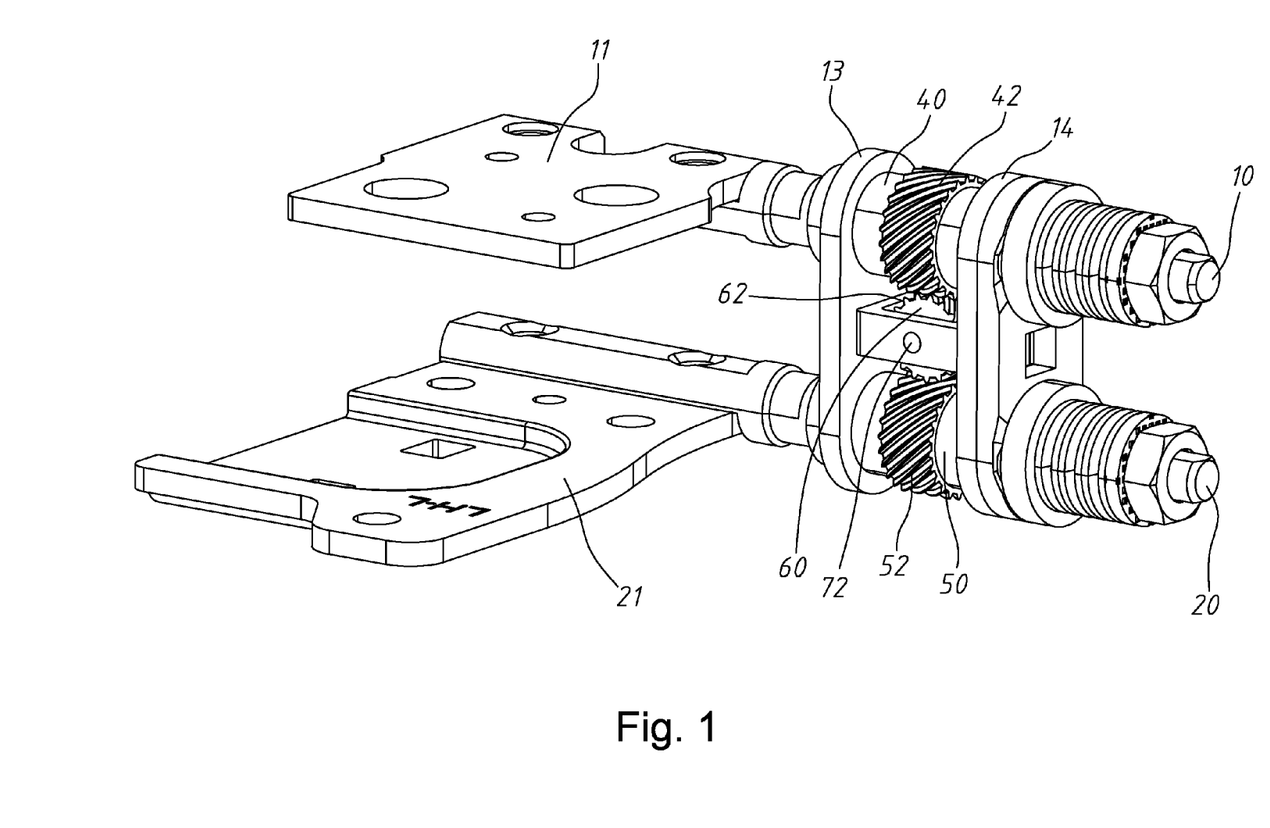
FIG. 1 is a perspective view of an embodiment of a transmission mechanism of the invention.
Figure 2:
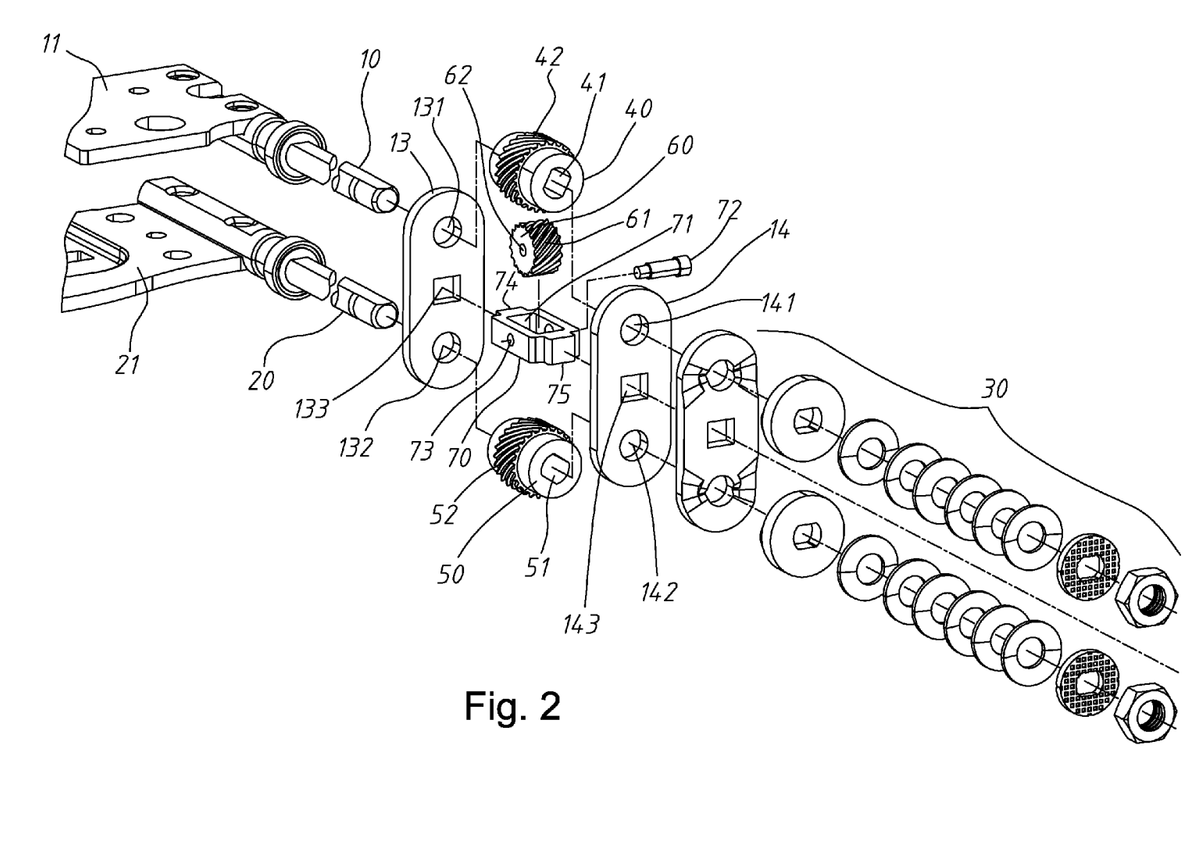
FIG. 2 is a perspective exploded view of the transmission mechanism of FIG. 1.
Figure 3:
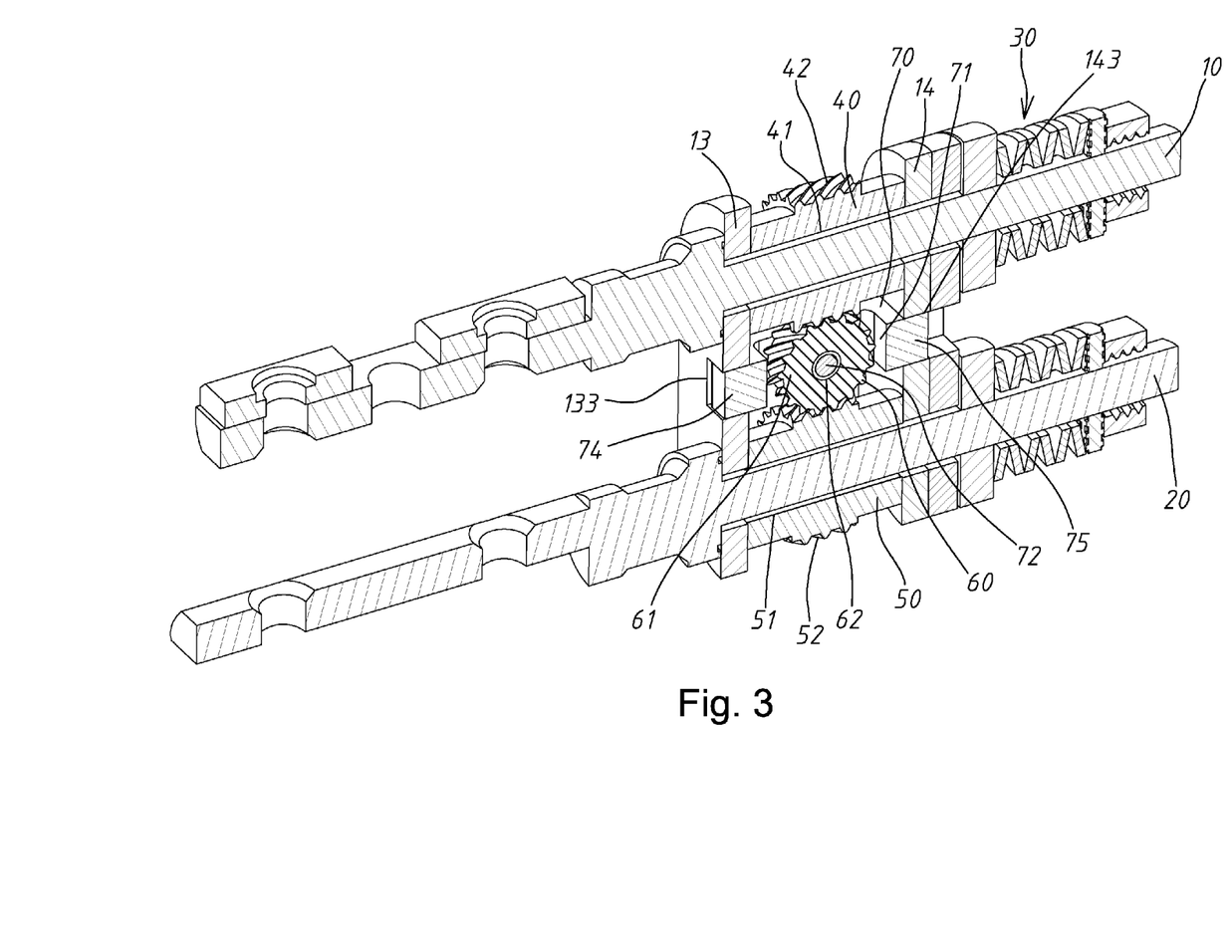
FIG. 3 is a cross section of the transmission mechanism of FIG. 1.

Referring to FIGS. 1-3, a transmission mechanism includes a first shaft 10 and a second shaft 20. One end of the first shaft 10 is joined to a first mounting plate 11 mounted to a display of a laptop, and the other end of the first shaft 10 is joined to a concave washer, a convex washer, an elastic mechanism or a securing mechanism. One end of the second shaft 20 is joined to a second mounting plate 21 mounted to a base of a laptop, and the other end of the second shaft 20 is joined to a concave washer, a convex washer, an elastic mechanism or a securing mechanism.

The first shaft 10 and the second shaft 20 are parallel and extend through a first positioning plate 13 and a second positioning plate 14 spaced from the first positioning plate 13 by a distance. The first positioning plate 13 has a first positioning hole 131 and a second positioning hole 132, and the second positioning plate 14 has a first positioning hole 141 and a second positioning hole 142. The first shaft 10 extends through the first positioning hole 131 and the second positioning hole 141, and the second shaft 20 extends through the first positioning hole 132 and the second positioning hole 42. Each of the first shaft 10 and the second shaft 20 has flat planes on two opposite sides of its outer periphery, which is a double D shaft. The first positioning holes 131, 141 and the second positioning holes 132, 142 have however a circular cross section. In such a structure, the first shaft 10 and the second shaft 20 are able to rotate when the first shaft 10 and the second shaft 20 are fitted to the first positioning holes 131, 141 and the second positioning holes 132, 142 respectively. A first hole 133 is formed on the first positioning plate 13 and located between the first positioning hole 131 and the second positioning hole 132. A second hole 143 is formed on the second positioning plate 40 and located between the first positioning hole 141 and the second positioning hole 142.

A first gear 40 and a second gear 50 are disposed between the first positioning plate 13 and the second positioning plate 14. The first gear 40 is mounted on the first shaft 10, and the second gear 50 is mounted on the second shaft 20. In this embodiment, the first gear 40 has a central hole 41 having a cross section similar to a cross section of the first shaft 10, and the second gear 50 has a central hole 51 having a cross section similar to a cross section of the second shaft 20. The first gear 40 has a first helical tooth portion 42, and the second gear 50 has a second helical tooth portion 52. The first helical tooth portion 42 has the same tooth profile and helix angle as the second helical tooth portion 52.

A middle gear 60 is disposed between the first gear 40 and the second gear 50. The middle gear 60 has a transmitting helical tooth portion 61 engaging the first helical tooth portion 42 and the second helical tooth portion 52.

The middle gear 60 is mounted in a frame 70 disposed between the first positioning plate 13 and the second positioning plate 14. In this embodiment, the frame 70 has a space 71 accommodating the middle gear 60. A pin 72 (axis) extends through holes 73 (only one hole 73 is shown in FIG. 2) formed on the frame 70 and a central hole 62 of the middle gear 60, whereby the middle gear 60 is positioned on the frame 70, and rotatable about the pin 72. The pin 72 is skew with the first shaft 10 and the second shaft 20. The frame 70 further has two lateral extending portions 74 and 75 inserted into the first hole 133 and second hole 143.

Figure 4:
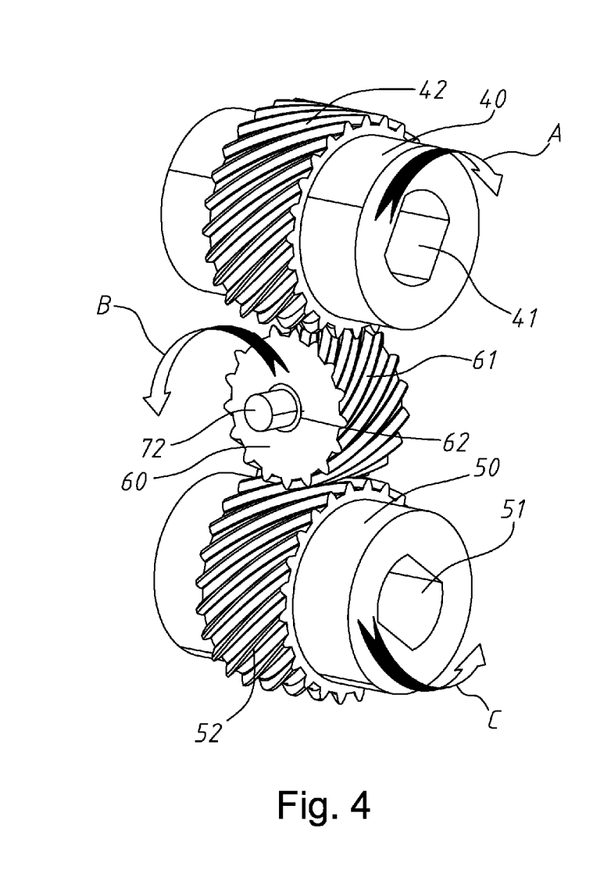
FIG. 4 depicts engagement of helical gear set of the invention.
Figure 5:
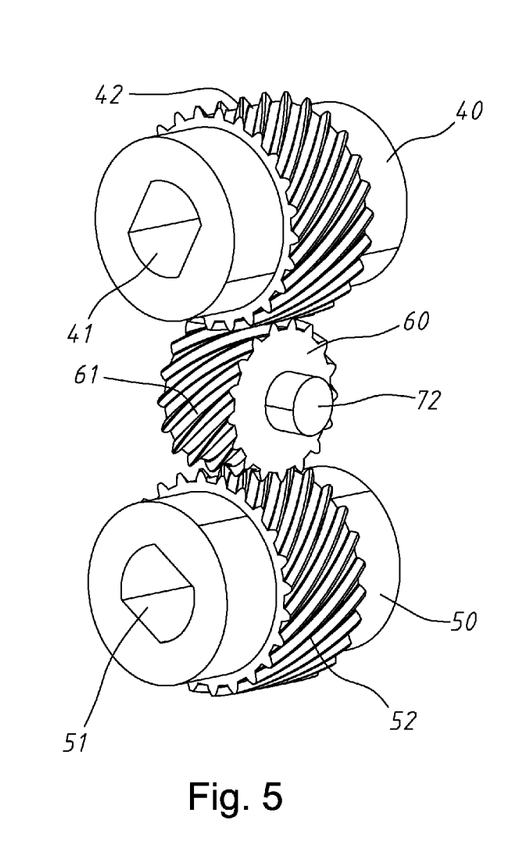
FIG. 5 depicts the helical gear set of FIG. 4 in another direction.
Figure 6:
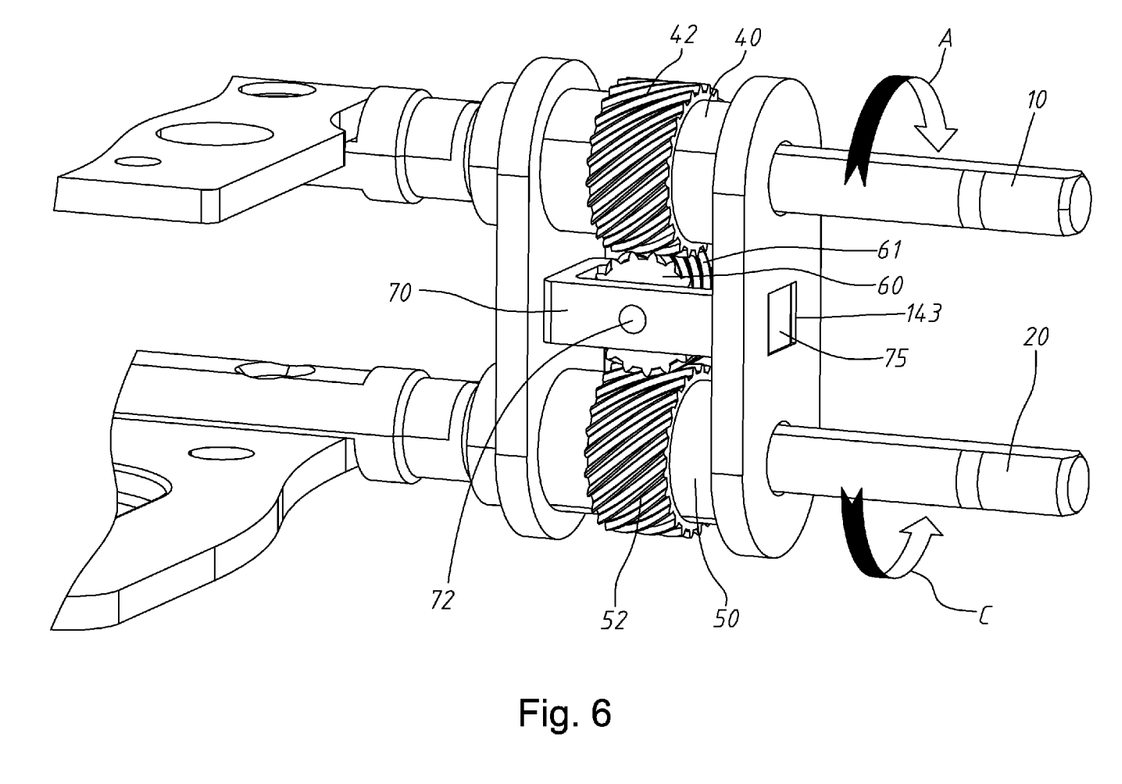
FIG. 6 depicts synchronous rotation of a first shaft and a second shaft of the invention.

Referring to FIGS. 4 and 5, when the display is lifted, the first shaft 10 and the second shaft 20 rotate synchronously. The first shaft 10 drives the first gear 40 to rotate in a direction shown by arrow A. The first helical tooth portion 42 of the first gear 40 drives the transmitting helical tooth portion 61 of the middle gear 60 to rotate in a direction shown by arrow B. The transmitting helical tooth portion 61 of the middle gear 60 drives the second helical tooth portion 52 to rotate the second gear 50 in a direction shown by arrow C which is opposite to the direction shown by arrow A. Therefore, the second shaft 20 rotates in a direction opposite to the first shaft 10, as shown in FIG. 6.

Figure 7:
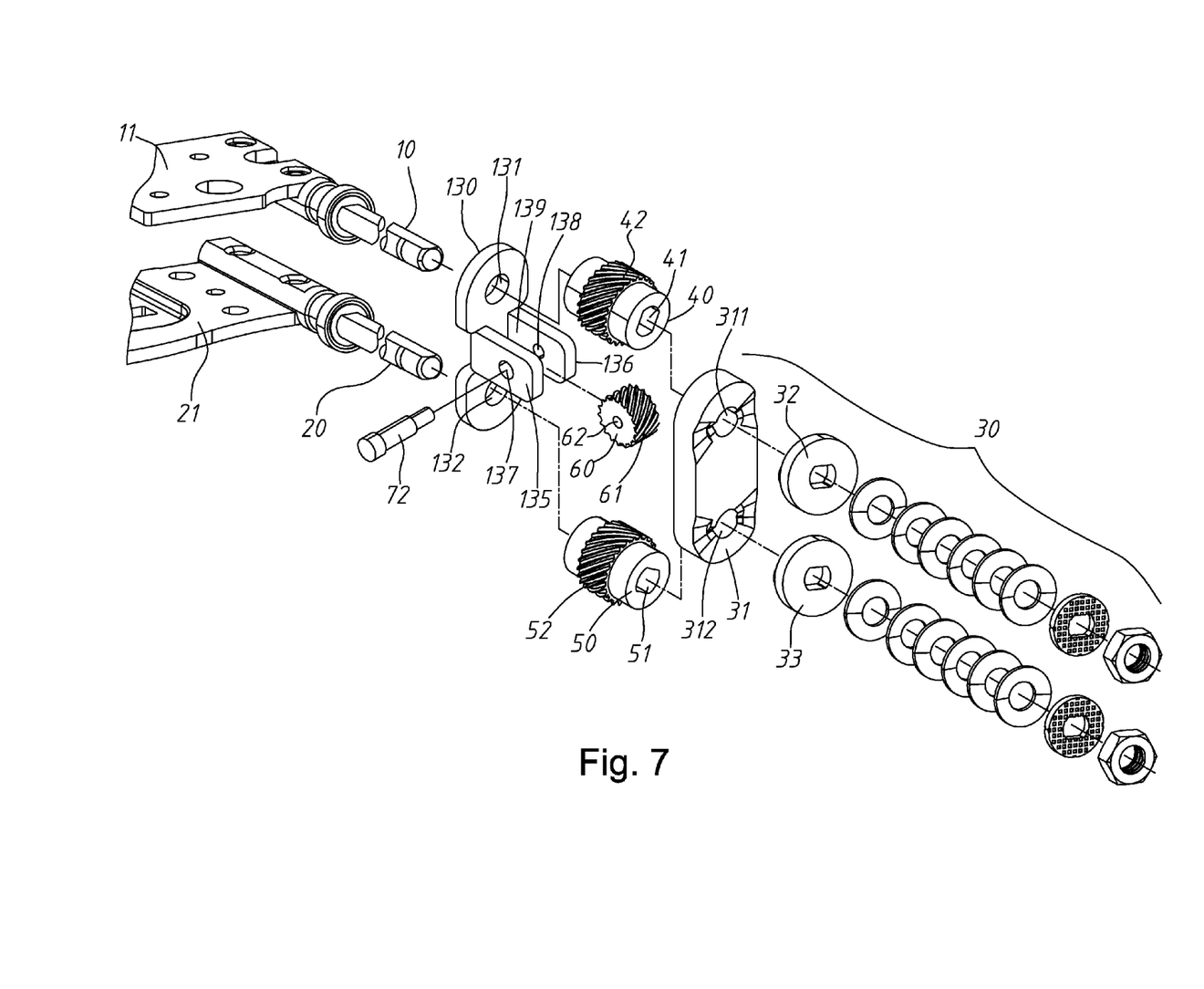
FIG. 7 is a perspective exploded view of another embodiment of a transmission mechanism of the invention.

FIG. 7 depicts another embodiment of the transmission mechanism of the invention. In this embodiment, transmission mechanism includes one positioning plate 130, and the other positioning plate and frame is omitted. One end of the first shaft 10 extends through the first positioning hole 131, and the other end of the first shaft 10 extends through a through hole 311 formed on a concave washer 31 and a through hole of a first convex washer 32. One end of the second shaft 20 extends through the second positioning hole 132, and the other end of the second shaft 20 extends through a through hole 312 formed on the concave washer 31 and a through hole of a second convex washer 33. Tabs 135 and 136 protrude from the positioning plate 130 to form a clip slot 139. The tab 135 has a through hole 137, and the tab 136 has a through hole 138. The middle gear 60 is held in the clip slot 139, and a pin 72 (axis) extends through the through holes 137 and 138 and the central hole 62 of the middle gear 60, whereby the middle gear 60 is positioned in the clip slot 139 and rotatable about the pin 72 which is skew with the first shaft 10 and the second shaft 20. The transmitting helical tooth portion 61 of the middle gear 60 engages the first helical tooth portion 42 of the first gear 40 and the second helical tooth portion 52 of the second gear 50.

Figure 8:
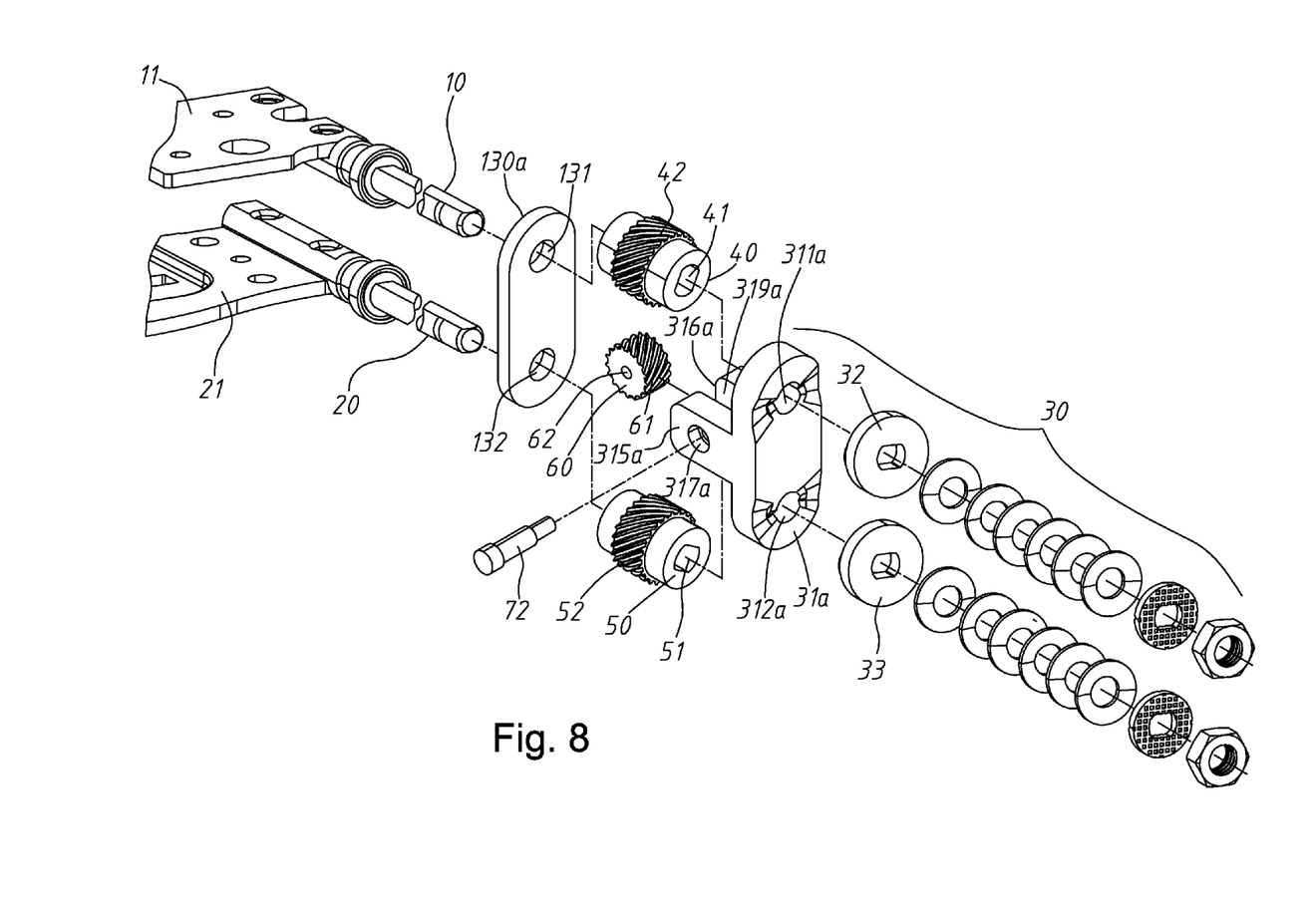
FIG. 8 is a perspective exploded view of another embodiment of a transmission mechanism of the invention.

FIG. 8 depicts another embodiment of the transmission mechanism of the invention. In this embodiment, transmission mechanism includes one positioning plate 130a, and the other positioning plate and frame is omitted. One end of the first shaft 10 extends through the first positioning hole 131 of at least one positioning plate 130a, and the other end of the first shaft 10 extends through a through hole 311a formed on a concave washer 31a and a through hole of a first convex washer 32 of a securing mechanism 30. One end of the second shaft 20 extends through the second positioning hole 132 of the at least one positioning plate 130a, and the other end of the second shaft 20 extends through a through hole 312a formed on the concave washer 31a and a through hole of a second convex washer 33 of the securing mechanism 30. Tabs 315a and 316a protrude from the concave washer 31a to form a clip slot 319a. The tab 315a has a through hole 317a, and the tab 316 has a through hole (not shown). The middle gear 60 is held in the clip slot 319a, and a pin 72 (axis) extends through the through holes 317a, the through hole formed on the tab 316a and the central hole 62 of the middle gear 60, whereby the middle gear 60 is positioned in the clip slot 319a and rotatable about the pin 72 which is skew with the first shaft 10 and he second shaft 20. The transmitting helical tooth portion

61 of the middle gear 60 engages the first helical tooth portion 42 of the first gear 40 and the second helical tooth portion 52 of the second gear 50.

The transmission mechanism of the invention utilizes gear set disposed between two shafts of the dual-shaft hinge to facilitate synchronous rotation of the two shafts and be conducive to the miniaturization of laptops.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmission mechanism for dual shaft hinge, comprising:
    a first shaft connected to a first mounting plate at one end and fitted to at least one positioning plate, a concave washer and a first convex washer at the other end;
    a second shaft connected to a second mounting plate at one end and fitted to the positioning plate, the concave washer and a second convex washer at the other end;
    a first gear mounted on the first shaft, located between the positioning plate and the concave washer and having a first helical tooth portion, the first helical tooth portion has a first tooth profile and a first helix angle;
    a second gear mounted on the second shaft, located between the positioning plate and the concave washer and having a second helical tooth portion, the second helical tooth portion having a second tooth profile and a second helix angle, the second tooth profile and a second helix angle of the second helical tooth portion are the same as the first tooth profile and the first helix angle of the first helical tooth portion; and
    a middle gear located between and directly engaging the first gear and the second gear and having a transmitting helical tooth portion engaging the first helical tooth portion and the second helical tooth portion, wherein the concave washer has a first hole for the first shaft extending therethrough, a second hole for the second shaft extending therethrough and two tabs protruding from the washer forming a clip slot to hold the middle gear, the middle gear rotates about a middle axis located perpendicular to a first axis of the first shaft and a second axis of the second shaft, the first axis of the first shaft and the second axis of the second shaft are parallel;
    wherein a pin is axially inserted through the middle gear, the first shaft is located parallel to the second shaft, the pin is located perpendicular to the first shaft and the second shaft, the middle axis of the middle gear is located perpendicular to the first axis of the first gear and the second axis of the second gear.

2. The transmission mechanism as claimed in claim 1, wherein each of the tabs has a through hole, opposing ends of the pin are located in a corresponding through hole of the through hole of the two tabs of the concave washer.

3. The transmission mechanism as claimed in claim 1, wherein the transmission mechanism consisting of three gears being the first gear, the second gear, and the middle gear.

* * * * *